United States Patent

Hay

[15] 3,700,298

[45] Oct. 24, 1972

[54] ADJUSTABLE SELF-ALIGNING BEARING MOUNT

[72] Inventor: Charles N. Hay, Sandusky, Ohio

[73] Assignee: General Motors Corporation, Detroit, Mich.

[22] Filed: Aug. 23, 1971

[21] Appl. No.: 174,053

[52] U.S. Cl..................................308/194, 308/72
[51] Int. Cl.............................F16c 23/00, F16c 23/08
[58] Field of Search..............308/194, 72, 61, 15, 35

[56] References Cited

FOREIGN PATENTS OR APPLICATIONS 157,533  7/1954  Australia.....................308/72

Primary Examiner—Martin P. Schwadron
Assistant Examiner—Frank Susko
Attorney—J. L. Carpenter et al.

[57] ABSTRACT

An adjustable self-aligning bearing mount in which a bearing is clamped in a pillow block formed by a pair of flanged housing halves having abutting helically ramped faces so that these housing halves can be axially adjusted to the proper straddle for a particular bearing.

6 Claims, 3 Drawing Figures

Patented Oct. 24, 1972

3,700,298

INVENTOR.
Charles N. Hay
BY
Arthur N. Krein
ATTORNEY

ADJUSTABLE SELF-ALIGNING BEARING MOUNT

This invention relates to a bearing pillow block assembly and, in particular, to an adjustable self-aligning bearing assembly.

It is well known to use a pillow block for bearings of the type in which the pillow block is formed by a pair of flanged housing halves having spherical bearing supports for providing a seat for self-alignment of a bearing therein. A pillow block of this type is disclosed, for example, in U.S. Pat. No. 2,731,310 issued Jan. 17, 1956 to Howell L. Potter. However, pillow blocks of this type are not adjustable and therefore, close manufacturing tolerance must be maintained during manufacture of both the bearing and the housing halves of the pillow block. In addition, these pillow blocks are adapted for use only with bearings having a spherical surface on its outer ring.

It is therefore a principal object of this invention to improve a pillow block to provide an adjustable self-aligning mounting for bearings having either a spherical surface or a straight cylindrical surface on its outer ring.

Another object of this invention is to improve pillow blocks for bearings whereby the halves of a pillow block are adjustable axially relative to each other to accommodate bearings having slight variations in their widths and while permitting self-alignment of a bearing therein.

These and other objects of the invention are obtained by means of an adjustable self-aligning bearing mount in which a bearing is clamped by its outside diameter between flanged housing halves having a spherical bore therein. To maintain a proper friction fit for the bearing, the flanged housing halves are provided with facing helical ramps which permit adjustment to the proper straddle for the given width of a particular bearing. Mating bolt hole slots on the ramps allow the flanges to be bolted together and to a support, with ramp friction aiding retaining of the proper position of the halves with respect to each other.

For a better understanding of the invention as well as other objects and further features thereof, reference is had to the following detailed description of the invention to be read in connection with the accompanying drawings, wherein.

Figure 1:
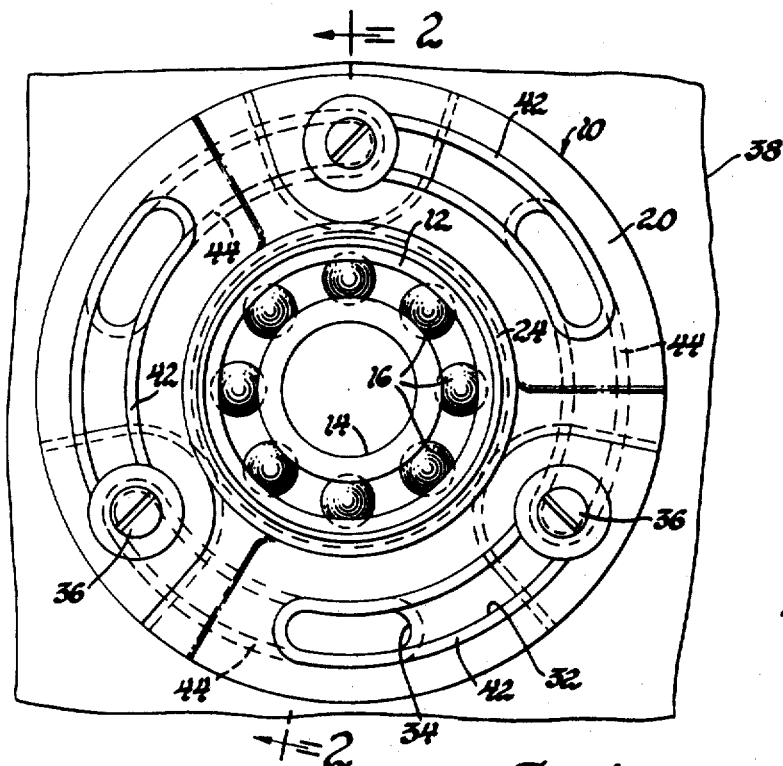
FIG. 1 is an end view of an adjustable self-aligning bearing assembly in accordance with the invention.

As shown in the drawings, the pillow block or bearing housing, generally indicated 10, is of the two piece flange type to house a bearing such as the anti-friction bearing having an outer ring 12, and an inner ring 14 with balls 16 interposed therebetween. The bearing may be either of the type having a spherical surface on its outer ring or, as shown, the bearing may be of the type having an inexpensive standard straight cylindrical outer diameter surface 18 on its outer ring.

The improved pillow block or bearing housing 10 is preferably formed of pressed steel or other metal of two mirrored flanged housing halves or members which when secured together form a housing for the bearing.

As shown, the pillow block consists of two flange housing halves or members 20 and 22, each preferably having a body portion of disc form and having centrally apertured axially extending housing flange bearing seat portions 24 and 26, respectively, projecting therefrom of part-spherical shape so as to accommodate either the spherical shape and outer surface of an outer bearing ring or the outer corner edges of the cylindrical surface of the outer ring of the type bearing shown. The body portions of the members 20 and 22 are also provided with helical ramps 28 and 30, respectively, three equally spaced ramps being shown in the embodiment illustrated, with mating arcuate slots 32 and 34 on these ramps, respectively, to receive bolts 36 to allow the flange housing halves or members 20 and 22 to be secured together and to a support, which as shown in FIGS. 1 and 2 may be a machine frame element 38 on which the assembly is to be used, or which, as shown in FIG. 3, may be a flanged pedestal 38a having bolt holes 40 in the bottom leg thereof for assembly of bearing, housing members and pedestal as a unit on a machine element, as desired.

In assembling a bearing in the pillow block, the two flange housing halves 20 and 22 are positioned back to back with their ramps 28 and 30, respectively, in engagement with each other and with a bearing positioned in the bearing seat portions 24 and 26 of these units. Then these housing halves are rotated with respect to each other which, due to engagement of the mating helical ramps on the back face of each, results in the axial adjustment of the space between them whereby the bearing is clamped within the bearing seat portions 24 and 26. In the case of a bearing of the type shown, it is clamped at opposite outside diameter corners in these bearing seat portions and aligned therein, whereas with a bearing having an outer ring with a spherical surface of the self-aligning type, the bearing seat portions, as previously described, are shaped to accommodate the spherical surface of this latter type bearing to self-align the bearing in these seat portions. It can be seen then that manufacturing tolerances can be relaxed both in the manufacturing of the outer race of the bearing and in the manufacturing of the housing members due to the adjustable feature of the subject bearing mount.

Figure 2:
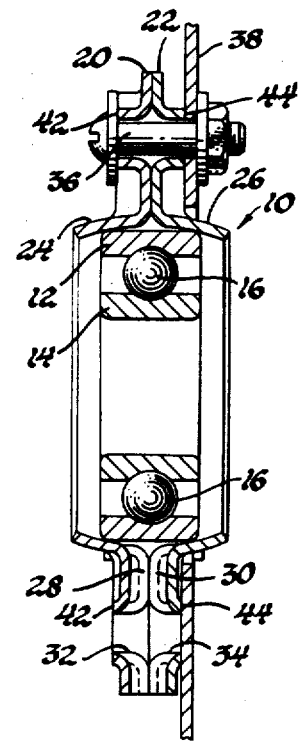
FIG. 2 is a sectional view of the bearing assembly of FIG. 1 taken along line 2—2 of FIG. 1; and, FIG. 3 is a side view of the bearing assembly of FIG. 1 with the pillow block mounted on a supplementary pedestal piece.
Figure 3:
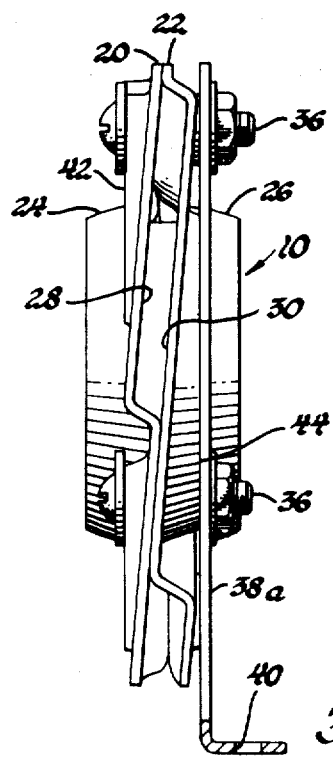

In forming the flange housing halves, the edges 42 and 44 of the mounting slots 32 and 34, respectively, are extruded back from the ramp surfaces to lie in the same plane at right angles to the axis of apertured bearing seat portions 24 and 26, respectively, of housing halves to assure a level surface for mounting one member flat on an element, such as element 38 and for bolt heads on the other member, as best seen in FIGS. 2 and 3. That is, using flange housing member 20 as an example, its body portion is stamped to form the helical ramps 28 thereon and then a central arcuate portion of each of the ramps 28, when forming the slots 32 therein, is extruded to form a reverse configuration of its associated ramp so that the edges 42 around the slots 32 of this housing member are always parallel with the edges 44 of housing member 22, formed in a similar manner, in any rotative position of one housing member with respect to the other housing member with their ramps 28, 30 in engagement with each other.

WHAT IS CLAIMED IS:

1. An adjustable self-aligning bearing mount comprising a housing including a pair of members, each of said members having a body portion with circumferentially equally spaced arcuate slotted ramps thereon and an axially extending apertured bearing seat flange of part-spherical cross section, means extending through said slotted ramps of said members adjustably securing said members in back-to-back relation to each other with said slotted ramps of one member engaging said slotted ramps of the other member and with said bearing seat flanges of said members extending in opposite directions and, an anti-friction bearing mounted in said bearing seat flanges.

2. An adjustable self-aligning bearing mount comprising a housing including a pair of flange housing members, each with a central aperture therethrough surrounded by an out-turned part-spherical bearing seat, each of said flange housing members having mating helically ramped faces on one side thereof with arcuate bolt receiving slots therethrough, means adjustably securing said flange housing members in back-to-back relation with said bearing seats extending axially in opposite directions, an anti-friction bearing positioned in said bearing seats, said flange housing members being adjustable rotatively with respect to each other so that they are axially adjustable by said mating ramped faces to straddle said bearing.

3. An adjustable self-aligning bearing mount according to claim 2 wherein the edges around said bolt receiving slots of a flange housing member lie in a common plane at right angles to the axis of said central aperture through said flange housing member.

4. An adjustable self-aligning bearing assembly comprising a housing formed of a pair of housing members, each of said housing members having a body portion with circumferentially equally spaced apart helical ramps extending from one side thereof, each of said ramps having a slot therein, the edges of which extending from the opposite side of said body portion from said ramps lie in a common plane, and an axially extending apertured part-spherical bearing seat flange, means extending through said slots in said ramps adjustably securing said housing members in back-to-back relation to each other with said ramps of one said housing member engaging the ramps of the other of said housing member with said apertured part-spherical bearing seat flanges of said housing members extending in opposite directions and, an anti-friction bearing mounted in said bearing seat flanges.

5. An adjustable self-aligning bearing assembly including a housing comprising two discs having central apertures therethrough surrounded by a part-spherical flange, means adjustably securing said disc in back-to-back relationship with said flanges extending axially outwardly, said means including slotted circumferentially spaced ramps on each of said discs in abutting relationship to each other and bolt means extending through said slotted ramps.

6. In a bearing assembly, a pair of housing discs having circumferentially spaced helical ramps positioned in back-to-back relationship with said ramps of one housing disc abutting said ramps of the other housing disc, said housing discs having laterally and oppositely directed annular flanges of part-spherical shape to form a generally spherical housing for a bearing, a bearing unit positioned in said housing, said ramps each having an arcuate slot therein, and means extending through said slots for adjustably securing said housing discs together.

* * * * *